United States Patent
Wiening

(10) Patent No.: US 9,440,766 B2
(45) Date of Patent: Sep. 13, 2016

(54) SEALING DISC COMPRISING A TAB

(75) Inventor: Heinz-Rudolf Wiening, Alfeld OT Gerzen (DE)

(73) Assignee: ALFELDER KUNSTSTOFFWERKE HERM. MEYER GMBH, Alfeld/Leine (DE)

( * ) Notice: Subject to any disclaimer, the term of this patent is extended or adjusted under 35 U.S.C. 154(b) by 0 days.

(21) Appl. No.: 14/116,610

(22) PCT Filed: May 2, 2012

(86) PCT No.: PCT/EP2012/058009
§ 371 (c)(1),
(2), (4) Date: Mar. 28, 2014

(87) PCT Pub. No.: WO2012/152622
PCT Pub. Date: Nov. 15, 2012

(65) Prior Publication Data
US 2014/0076898 A1 Mar. 20, 2014

(30) Foreign Application Priority Data

May 12, 2011 (DE) .................. 10 2011 101 424
Jul. 5, 2011 (DE) .................. 10 2011 106 768

(51) Int. Cl.
*B65D 8/06* (2006.01)
*B65D 17/00* (2006.01)
(Continued)

(52) U.S. Cl.
CPC ............ *B65D 17/165* (2013.01); *B32B 3/263* (2013.01); *B32B 15/046* (2013.01); *B32B 15/20* (2013.01);
(Continued)

(58) Field of Classification Search
CPC ..... B32B 15/20; B32B 27/065; B32B 27/36; B32B 15/046; B32B 3/263; B32B 2307/31; B32B 2266/025; B32B 2435/00; B32B 2307/304; B32B 15/09; B32B 3/02; B32B 3/04; B32B 3/06; B65D 53/04; B65D 41/045; B65D 17/165; B65D 2251/0015; B65D 2251/0093; B65D 2577/205
USPC .................................................. 220/609, 269
See application file for complete search history.

(56) References Cited

U.S. PATENT DOCUMENTS 3,786,954 A * 1/1974 Shull .............................. 215/341
5,492,077 A * 2/1996 Rose .............................. 116/307
(Continued)

FOREIGN PATENT DOCUMENTS

DE 39 20 324 1/1991
DE 199 20 586 11/2000
(Continued)

*Primary Examiner* — Anthony Stashick
*Assistant Examiner* — James M Van Buskirk
(74) *Attorney, Agent, or Firm* — Salter & Michaelson

(57) ABSTRACT

The invention relates to a sealing disc for a container closure used for a container having a mouth delimited by a circumferential edge. The sealing disc is composed of a plurality of layers with an edge. Before the container is opened for the first time, at least one group of layers tightly closes the mouth of said container. One of the layers is a metallic layer that can be heated by induction. The other layers are non-metallic and unable to be directly heated by induction. The group of layers can be sealed, using a sealing layer, on the circumferential edge of the mouth. One of the layers is composed of a thermally insulating material. The sealing disc has at least one grip tab. The grip tab is formed from just one or more of the layers of the layer group. The surfaces of the layers that form said grip tab project beyond the edge of the metallic, induction-heatable layer of the group for the length of the surface of the grip tab. Said grip tab is formed only from the layer composed of thermally insulating material, or from said layer and one or more of the other non-metallic layers that are unable to be directly heated by induction. The grip tab is doubled over on the uppermost layer of the sealing disc.

25 Claims, 1 Drawing Sheet

(51) Int. Cl.
- *B65D 41/04* (2006.01)
- *B65D 53/04* (2006.01)
- *B32B 15/04* (2006.01)
- *B32B 15/20* (2006.01)
- *B32B 27/06* (2006.01)
- *B32B 27/36* (2006.01)
- *B32B 3/26* (2006.01)

(52) U.S. Cl.
CPC ............ *B32B 27/065* (2013.01); *B32B 27/36* (2013.01); *B65D 41/045* (2013.01); *B65D 53/04* (2013.01); *B32B 2266/025* (2013.01); *B32B 2307/304* (2013.01); *B32B 2307/31* (2013.01); *B32B 2435/00* (2013.01); *B65D 2251/0015* (2013.01); *B65D 2251/0093* (2013.01); *B65D 2577/205* (2013.01)

(56) References Cited

U.S. PATENT DOCUMENTS

| | | | | |
|---|---|---|---|---|
| 6,974,045 | B1* | 12/2005 | Trombach et al. | 215/232 |
| 7,798,359 | B1* | 9/2010 | Marsella | B32B 7/12 |
| | | | | 215/232 |

FOREIGN PATENT DOCUMENTS

| | | |
|---|---|---|
| DE | 10 2007 014 084 | 7/2008 |
| EP | 0 408 217 | 1/1991 |
| EP | 0 668 221 | 8/1995 |
| EP | 0 717 710 | 6/1996 |
| EP | 1 454 840 | 8/2004 |
| EP | 1 837 288 | 9/2007 |
| EP | 2 045 194 | 4/2009 |
| EP | 2 230 190 | 9/2010 |
| GB | 2 330 134 | 4/1999 |
| JP | 2000 191021 | 7/2000 |
| WO | 2010 115811 | 3/2010 |

\* cited by examiner

SEALING DISC COMPRISING A TAB

TECHNICAL FIELD

The invention relates to a sealing disc for a container closure used for a container having a mouth delimited by a circumferential edge, in which the sealing disc is composed of a plurality of layers with an edge, of which, before the container is opened for the first time, at least one group of layers tightly closes the mouth of said container, in which one of the layers is a metallic layer that can be heated by induction, in which the other layers are non-metallic and unable to be directly heated by induction, in which the group of layers can be sealed, using a sealing layer, on the circumferential edge of the mouth, in which the sealing disc has at least one grip tab, in which the grip tab is formed from just one or more of the layers of the layer group, and in which the surfaces of the layers that form said grip tab project beyond the edge of the other layer of the group for the length of the surface of the grip tab.

BACKGROUND OF THE INVENTION

Containers serve to hold contents, for example to hold liquids or powdered foodstuffs or other substances. The containers have an opening or mouth. It is often desirable or even necessary to close this container mouth with a disc-shaped seal in order to tightly seal off the contents from external influences.

There are a number of reasons for the requirement of this tight seal. On the one hand, the contents need to be protected against interfering influences from the outside, such as, for example the penetration of water vapor or oxygen; on the other hand, the contents also need to remain odor-tight. There is another reason in the case of aggressive filling materials, for which a leakage protection that is as optimal as possible needs to be provided. Finally, such a tight seal can also afford a tamper-evident closure for commerce, because a user can recognize immediately whether someone has already manipulated the container contents beforehand.

In addition, the container opening is then closed additionally with a screw cap or a similar element, which provides for the mechanical and stable closure of the container opening outside of the disc-shaped seal. In this case, the disc-shaped seal itself is a flexible thin film. On first-time use after acquisition, the user unscrews the screw cap and breaks the film in order to obtain the contents of the container. Afterward, he reseals the container if the entire contents have not yet been withdrawn. This renewed closure occurs by screwing the screw cap back onto a corresponding counterthread on the container opening, now without the film, which has meanwhile been broken and removed. The screw closure can close the opened contents, if need be, possibly for a period of time that is not as long as the tamper-evident closure configuration, but is nonetheless a satisfactory period of time for the user, who can control it himself from then on.

The film that seals the container contents, such as is known from EP 0 717 710 B1, for example, is applied by means of induction sealing. To this end, a complete sealing disc is put in place, the bottommost layer of which forms the sealing layer. Lying above the latter is a metallic second layer, generally consisting of aluminum, which serves for thermal coupling and heat transfer during the induction process and, if need be, forms an additional mechanical protection. The second layer is bonded to the first layer tightly and especially in a manner that provides good conduction for heat transfer. If need be, yet further layer-like components of the sealing disc, which remain in the cap when the screw closure or other rotating closure is opened, are then provided above the mentioned aluminum layer.

A constant problem in the case of such closures, which are intrinsically well proven and reliable, is the initial opening by the user or consumer. Breaking of this film or group composed of the lower layers, which are situated on the mouth of the container when it is first opened, by a knife or by the finger of the user is not possible or hygienic for all container contents, on the one hand, and leaves the rest of the film on the edge of the opening of the container, on the other hand, which can impede the container contents from later being poured or shaken out.

In order to make opening more convenient for the user and also safer for further use, the user is provided with a grip for pulling off the film. For example, this grip can be a grip tab that projects outward, as proposed in DE 39 20 324 A1 and EP 0 408 217 A1, which thus can then be gripped by the user outside the edge of the mouth and pulled upward, so that the entire film detaches from the container edge.

However, this quite simple and intrinsically satisfying concept has the drawback that the grip tabs interfere with the screw cap when it is screwed in place, because they need to be accommodated in the thread and screw cap in a suitable form. On the one hand, little space is available there and, on the other hand, these grip tabs can also impede the function of the screwing operation. Conversely, the grip tabs can also be damaged or, in the worst case scenario, even the entire sealing disc impeded in its sealing function by the screwing operation.

In proposals taken from EP 0 668 221 B1, GB 2 330 134 A, JP 2000-191021 A, and DE 10 2007 014 084 B3, the sealing discs are furnished with grip tabs for which the thickness of the grip tab is less than the thickness of the other surface areas of the sealing disc so as to reduce the problem encountered with grip tabs that project into the threads of screw caps. This is accomplished by having only one or a few of the plurality of layers of the sealing disc also form the grip tab.

Owing to the fact that the tabs of the sealing discs are designed to be very thin, they can be accommodated far more flexibly in the remaining empty spaces within the screw cap and the screw cap thread. The risk of mutual destruction of the individual elements when the packaging is closed or even during the opening operation is thereby appreciably reduced.

Alternatively to or also in combination with this design of the grip tab with a lesser thickness, it is known from EP 2 045 194 B1 and WO 2010/115811 A1 to have the grip tabs not project outward into the thread, but rather to have them double over and insert back onto or between specific layers of the sealing disc.

However, this has other drawbacks. As has been found, such a doubling over into the surface area of the mouth onto the other layers of the sealing disc interferes with the induction sealing properties of the entire sealing disc composite. Namely, a double aluminum layer is present in this way in a subarea of the otherwise circularly symmetrical arrangement and this appreciably alters the induction sealing properties.

The same drawbacks arise in a second embodiment taken from EP 2 045 194 B1, published later. This embodiment doubles over on the grip tab, initially with all layers folded back by 180° on the top side of the sealing disc and then folded back on themselves a second time by 180°. This has the further drawback that the aluminum layer is overlaid three times in the area of the grip tab, thereby leading to a striking asymmetry of the induction properties.

As a result of an asymmetry of the induction properties, the area of the grip tab is not sealed tightly and cleanly enough, when a container is sealed, as is the sealing disc on the rest of the circumference of the opening of the container. Of course, attempts will be made to circumvent this problem by way of appropriate arrangements of the induction devices or skillful control. However, on the one hand, this is very tedious and, on the other hand, the basic problem of an asymmetric sealing remains. In particular, there remains the risk that, although the majority of all containers that are to be sealed are properly sealed owing to these additional measures, there is a higher likelihood of an outlier or a deficient sealing in isolated cases.

As a result, the user is then confronted with a container having a product that is already spoiled because it has not been properly stored in a sealed container or else he has the feeling that at least something is not right about the product or that someone has possibly already pulled on the tab before him in an attempt to open the product.

This behavior when the container is torn open by means of a tab is felt to be unpleasant and unreliable and hence rejected by the user. Here, it needs to be considered that a user is not aggravated just in this isolated instance, but will also extend his general rejection to the respective product series of the filler of the container and possibly will dispense with purchasing such goods in future instances, so that the manufacturer of the contents of containers that are to be packaged can also suffer damage to its image.

Therefore, the problem of the present invention is to propose a sealing disc by means of which the problems mentioned can be prevented to the greatest extent possible.

SUMMARY OF THE INVENTION

This problem is solved in accordance with the invention by the sealing disc described in the introduction in that another one of the layers of the group of layers is a layer made of thermally insulating material, that the grip tab is formed just from this layer made of thermally insulating material or from this layer and one or more of the other non-metallic layers that are unable to be directly heated by induction, and that the grip tab is folded and doubled over on the uppermost layer of the group of layers.

The solution according to the invention seems simple in retrospect. As also in the case of some proposals of the prior art, the grip tab is doubled over on the top side of the sealing disc in spite of the concerns and problems described, so that it does not project into the thread of a container. As a result, the problems associated with the thread now vanish.

The grip tab itself is designed such that it does not contain an aluminum layer, even though the aluminum layer is one of the plurality of layers from which the sealing disc is constructed. By dispensing with the aluminum layer in the grip tab, the problem encountered with an asymmetric sealing is completely eliminated, because the sealing disc is now once again absolutely circularly symmetric for the induction and the grip tab virtually does not exist for this aspect of the operation. The skilled practitioner is reluctant to omit the aluminum layer, since he is no longer able to work with a homogeneously continuous material web, from which the sealing discs together with the grip tabs can be punched out.

Of course, individual layers will not then be cut out of grip tabs during manufacture, but rather the individual layers will be laminated or allowed to merge a priori before cutting out or punching out the sealing discs in such a way that no aluminum layer is provided in a certain area.

Owing to the fact that most of the layers of the sealing disc are carried into the grip tab continuously, the integrity of the overall product is ensured. The grip tab is only insignificantly thinner than the sealing disc in the other surface areas, and the absence of the metallic layer, which preferably and particularly is made of aluminum, can readily be accepted in the area of the grip tab.

However, the ending of the aluminum layer in the interior of the layer composite of the group results in the formation of small gradations. The dimensions of these gradations, though, are extremely small in relation to the overall dimensions of the sealing disc. This can be compensated for in an especially simple manner in that one of the layers following the metallic layer is constructed as an elastic layer, in particular as a layer constructed from a foamed plastic.

It is provided especially preferably that the layer made of thermally insulating material is a layer made of foamed plastic. This layer made of foamed plastic can then also be identical to the aforementioned elastic layer, which is used for compensation of the gradations.

In this case, it has been found to be especially advantageous when this layer is composed of an EPE foam (expanded polyethylene).

As has been found, the provision of this additional layer made of foamed plastic also solves another, quite serious problem, which has hitherto been an appreciable impediment when the grip tabs are doubled over. As mentioned, the sealing disc is sealed with a sealing layer on a container edge. This sealing layer is solid at room temperature. It develops its adhesive properties only through the supply of heat during the induction operation. The entire surface of this sealing layer is now carried completely forward during a web manufacture of the material for the sealing disc and is thus situated also on the grip tab. If the grip tab is now doubled over on the top side of the uppermost layer of the sealing disc, it develops its adhesive properties as in the prior art at this site, too, during the induction operation, as a result of which it can be tightly sealed to the container lid or else to a reseal part above the sealing disc. In order to prevent this, it is necessary to take tedious steps, such as, for example, doubling over on the grip tab twice, as described in EP 2 045 194 B1.

According to the present invention, however, it is now found that, owing to the provision of an additional layer made of thermally insulating material, in particular a layer made of plastic foam when this grip tab is doubled over on the uppermost layer of the sealing disc, an appreciable spacing is created by the grip tab between the sealing layer that now points away from the container and is directed upward and the metallic induction layer lying relatively close to the container opening, in contrast to the conventional sealing discs. Whereas the induction layer is directly adjacent in the direction toward the container or in any case separated from the sealing layer there by only a single layer or a few thin layers and hence the thermal energy can act directly and in full scope there on the sealing layer, the thermal energy produced in the induction layer during the same induction process has to pass upward through two layers of thermally insulating layers, in particular the layer made of plastic foam, until it enters the sealing layer that is on the grip tap there, which now lies on top.

As a result thereof, the thermal energy is no longer sufficient to allow the adhesive properties of the sealing layer on the grip tab to develop here, so that the very undesirable tight adherence and sealing of the sealing layer to the bottom side of a lid or a reseal part can be prevented.

Moreover, this effect can also be controlled by suitable choice of the elastic plastic foam material and appropriate selection of the thickness of this material, because the induced thermal energy and heat conduction behavior in the various layers during the induction process are known beforehand to the skilled practitioner or can be appropriately chosen by him.

It is insightful that this different and significantly varying spacing of the two sealing layers present in the sealing disc from the metallic induction layer lead, in spite of the thermal energy that is naturally identically coupled into the induction layer, to a different adhesive behavior. However, the ensuing solution is in no way obvious to the skilled practitioner, because it has hitherto always been attempted to design the grip tabs rather to be as thin as possible in order to prevent interference in the thread. Moreover, a corresponding thickening of the sealing disc naturally occurs in the area of the grip tab, which, however, affords less interference in the preferred embodiment of the invention essentially owing to an elastic character.

Such a layer also has the further advantage that, in the sealing disc, even tolerances due to manufacturing imprecision of the container opening or of the lid can be compensated for.

As mentioned, the layer made of thermally insulating material is preferably a layer made of plastic foam. This has appreciable advantages, in particular on account of its elasticity. Alternatively, a different material, which has the desired thermally insulating properties, such as, for example, paper, can also be used.

Owing to the fact that the metallic inductive behavior no longer poses any problems, the grip tap can readily be doubled over on the uppermost layer of the group of layers, that is, so that it again points in the direction of the center of the opening of the container when it is placed on the opening of the container.

The result of this is that, first of all, the sealing disc has the shape of a conventional, circular, flat sealing disc prior to its use by the company filling the container and can also be treated as such. A special orientation on the container is not necessary, because the sealing disc is outwardly symmetric.

The container does not need to be treated differently than before, either, for initial opening or later openings by the user. After the screw lid has been screwed open, the viewer sees the uppermost layer of the group, which seals off the opening of the container, that is, the container opening, and continues to seal and close the latter at this time as previously.

However, in contrast to the previous concepts, a grip tap now lies on top of the uppermost layer of the group in the center of the remaining part of the sealing disc and is freely accessible to the user. The user need only take this grip tab and pull on it, for which purpose he needs no further instructions whatsoever. The pulling exerts force on the edge of the group of layers of the sealing disc and does so, namely, directly on the sealing layer.

The sealing layer gives way immediately on being pulled and the pull on the grip tab thus at the same time lifts off all of the layers arranged above the sealing layer and hence the complete sealing disc with one pull. The container is thereby opened.

The thickness of the layer made of thermally insulating material, in particular made of foamed plastic, lies preferably between 50 µm and 300 µm. It is especially preferred when it lies between 90 µm and 200 µm. It is still more preferred when it lies between 110 µm and 130 µm.

These dimensions have afforded an especially clever and favorable relationship of the different requirements with respect to one another. Thus, the thickness of the grip tab, which is doubled over on the other layers, naturally increases with the thickness of the thermally insulating layer and this thickness has to be taken into appropriate consideration in the container closure. On the other hand, the thermal insulation also obtained and hence the desired effect of the sealing layer no longer attaining an elevated temperature increases with increasing thickness. Finally, other properties, such as, for instance, the tear strength of the grip tab, the ease of handling of the entire system, and also the costs for the sealing disc, including the grip tab, which likewise are optimized at these values, are to be taken into consideration.

It is especially preferred when the uppermost layer is composed of a material that has a high tear strength but, at the same time, is lightweight, such as, in particular, polyethylene terephthalate (PET). Layers made of this material increase the tear strength. This is appropriate not only in connection with the grip tab, but increases appreciably the tear strength of the layer composite having the metallic, particularly aluminum, layer. The aluminum layer as such is generally not especially tear-resistant, so that the combination with such a thin, tear-resistant PET layer is also of advantage in this connection.

In order for the consumer or user also to recognize the grip tab immediately, it can also be designed with a color or else be designed in another form so that it is clearly highlighted from the underlying layers either visually or in another form. This can be achieved especially simply by coloring the grip tab in a striking signal color, for instance in the company color of the manufacturer of the container contents, and/or in that the grip tab is imprinted with the company logo or with the brand.

The size of the grip tab is less critical than in the case of conventional concepts, because there is no longer any risk that the grip tab will interfere with the function of the screw thread of the screw lid.

The grip tab can thus project into the center of the sealing disc or else have complicated or ergonomic and haptically pleasant forms.

It would even be conceivable to have the grip tab either take a form that has an appropriate relationship to the product itself, that is, for example, the stylized form of a tomato, a coffee cup, or a piece of pastry or also take on the form of a company logo.

If the user now takes hold of this grip, which is not adhesively attached or otherwise fastened to the now uppermost layer adjacent to it, the user can use the tab to pull off all of the still present layers of the sealing disc from the container opening by an appropriate convenient application of force and thus break open the seal. The pulling on the tab pulls all layers at once upward without any further manipulation and without there being any risk that, owing to the pull on the tab, not all layers are lifted together using one hold and on one pull.

In a preferred embodiment, moreover, it is provided that a layer made of a polyester material is provided between the sealing layer and the metallic layer that can be heated by induction.

Such a layer has several advantageous effects.

On the one hand, it is particularly suited to enable sealing discs also to be used for container contents such as tomato ketchup, for instance, because they are thereby resistant toward the acids present in tomato ketchup and thus can increase the shelf life of closed containers filled with tomato ketchup.

If this layer is arranged between the induction layer and the sealing layer, it protects the entire sealing disc against the container interior. The sealing layer still lying in between is insignificant here, because it has already fulfilled its sealing property on the edge of the container opening at this point in time.

Besides the protective effect, this layer made of polyester material also has the effect of projecting into the grip tab and, as a result, of inserting between the sealing layer now lying at the very top and the metallic induction layer lying far below, when the grip tab is doubled over on the uppermost layer of the sealing disc, and of further reducing the heat conduction.

The presently described sealing disc is particularly suited for so-called dispensers, such as are often used for tomato ketchup or remoulade sauce, for instance. The sealing discs have a one-piece construction and generally have no so-called reseal parts.

A reseal part can be placed above the uppermost layer in another embodiment. For this purpose, a support layer or foam layer, which remains in the screw cap during the screwing operation and ensures sealing for a certain period of time after reclosure, would be provided.

In general, an adhesive separating layer, which is strong enough to hold together the sealing disc in the unopened state, but is not so strong as to prevent the bonding from being overcome at this very site when unscrewing is performed, is arranged above the uppermost layer and below the reseal part.

In this embodiment, the grip tab is folded and doubled over in the direction of the axis of the circular sealing disc. The adhesive separating layer is thus situated above this grip.

Further preferred features are specified in the dependent claims.

A manufacture of this sealing disc according to the invention is preferably possible using a method that operates similarly to the method proposed in DE 10 2007 014 084 B3.

DESCRIPTION OF THE DRAWINGS

An embodiment of the invention will be described in detail below on the basis of the drawing. Shown are.

DETAILED DESCRIPTION

Figure 1:
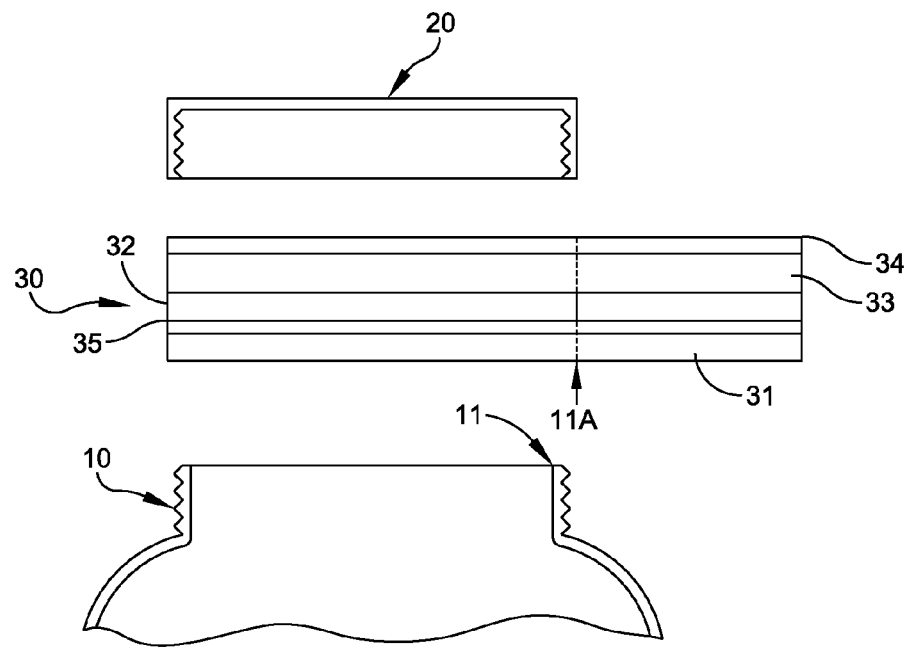
FIG. 1 a schematic cross section through an embodiment of the invention.

A container 10 and a lid 20 are not illustrated in FIG. 1 and are solely envisaged by means of their reference signs. The container 10 is, for example, a bottle for tomato ketchup or a glass container for ground coffee that can be closed in an aroma-tight manner or another uptake vessel. An opening of the container 10 has an edge 11, which is likewise indicated only in terms of its position. The opening 11 of the container is usually circular and flat.

A lid 20 serves for closing this mouth 11 of the container 10.

A sealing disc, which is illustrated in FIG. 1 in a cross section during its manufacturing process, serves for this purpose.

This illustration of the sealing disc serves for visualization and is solely to be understood in schematic terms. It shows that the sealing disc is composed of a group 30 of a plurality of layers. The surface of the group 30 is large enough with respect to its dimensions that it fits exactly to cover the mouth 11 of the container 10. Only in a subarea, which can be seen especially in the cross-sectional illustration in FIG. 1, do parts of several layers of the group 30 project from the layers over the edge of the mouth 11, which will be described in further detail below.

The sealing disc 30 has, as bottommost layer, a sealing layer 31. This sealing layer lies on the edge of the mouth 11 of the container 10.

This is followed by a layer 35 made of a polyester material as a second layer. This layer is resistant to an acid, for example, which is present in the interior portion of the container 10 of the product packaged therein, such as, for example, tomato ketchup. The polyester material may have a thickness of between 12 mm and 36 mm.

A metallic layer 32 that can be heated by induction follows as a third layer. When the container 10 is to be closed with the sealing disc, the sealing disc having the group 30 of layers is laid on the mouth 11 of the container 10. Afterward, a current is induced inductively in the metallic layer 32 that can be heated by induction, which is thereby heated. As a result of thermal conduction, the adjacent layers and also the sealing layer 31 that follows are likewise heated. As a result, they become soft and fuse in the area of the edge of the mouth 11 with the material of the container 10 or melt onto the latter. When the metallic layer 32 cools, the sealing layer 31 also cools back down and becomes solid, so that, as a result, the entire sealing disc with the group 30 of layers is sealed tightly to the mouth 11 of the container 10.

Following above the induction layer 32, that is, in the direction away from the mouth 11 of the container 10, is a layer 33 made of a thermally insulating material as an additional layer, in particular a layer made of a plastic foam. This layer 33, referred to as a foam layer for brevity, is elastic to a certain extent and hence is capable of compensating for any slight unevenness that arises during manufacture of the container mouth 11 or manufacture of the lid 20.

The foam layer 33 is particularly composed of a foamed plastic. Especially preferred in this case is a layer made of expanded polyethylene (EPE). This material also has, in particular, the advantage of being particularly light in weight and the advantage of offering protection against stress due to impact or pressure, for instance.

Situated above the foam layer 33 is a plastic layer 34, which, in the illustrated embodiment, is also the uppermost layer of the group 30 of layers of the sealing disc. Preferably, this uppermost layer consists of polyethylene terephthalate (PET). This material is especially easy to imprint and color and therefore also permits a visually appealing outward appearance to be offered by display on the uppermost layer.

For example, an image (not illustrated) can be printed on this plastic layer 34. This layer is the one that the user is presented with after lifting the lid 20 from the mouth 11 of the container 10. Hence, it is possible to print here, for example, a trademark of the container manufacturer or the manufacturer of the container contents in a highly appropriate manner. Alternatively, instructions for further operation may be given here or else an attractive design, which makes a statement about the contents of the container 10 itself—for instance, about its flavor or intended use—may be given here.

The sealing disc with the group 30 of layers from FIG. 1 is not yet finished, however. To this end, FIG. 2 supplements the visualization.

Seen here, too, is again the container 10, with its mouth 11 and the lid 20 merely being indicated. Shown in purely schematic and greatly enlarged form is that those sections of the layers of the group 30 that project outward over the edge of the mouth 11 of the container 10, are doubled over inward or are to be doubled over inward as illustrated at 11A in FIGS. 1 and 2. This area forms a grip tab 50. The grip tab 50 is laid flat on the uppermost layer 34 of the group 30 of layers and thus does not project beyond them, as might be assumed in the enlarged illustration in FIG. 2.

It is thus possible to place the lid 20 on the mouth 11 of the container 10 and to screw it in place without the grip tab interfering with the turns of a screw thread. Of course, the layers are appreciably flatter in relation to the diameter of the mouth 11 of the container 10.

The user thus sees a grip tab 50 above the surface of the uppermost layer 34. He takes hold of the grip tab 50, lifts it, and pulls on the grip tab 50. The exertion of this force causes the sealing strength of the sealing layer 31 on the edge of the mouth 11 of the container 10 to be overcome and the group 30 of layers detaches at this site from the edge of the mouth 11. Further pulling on the grip tab 50 upward then causes the additional sealed circular area, with which the sealing layer 31 is tightly sealed to the edge of the mouth 11 of the container 10, to detach successively. Finally, the user can pull off the entire sealing disc together with all of its components by means of the grip tab 50 and dispose of it.

Figure 2:
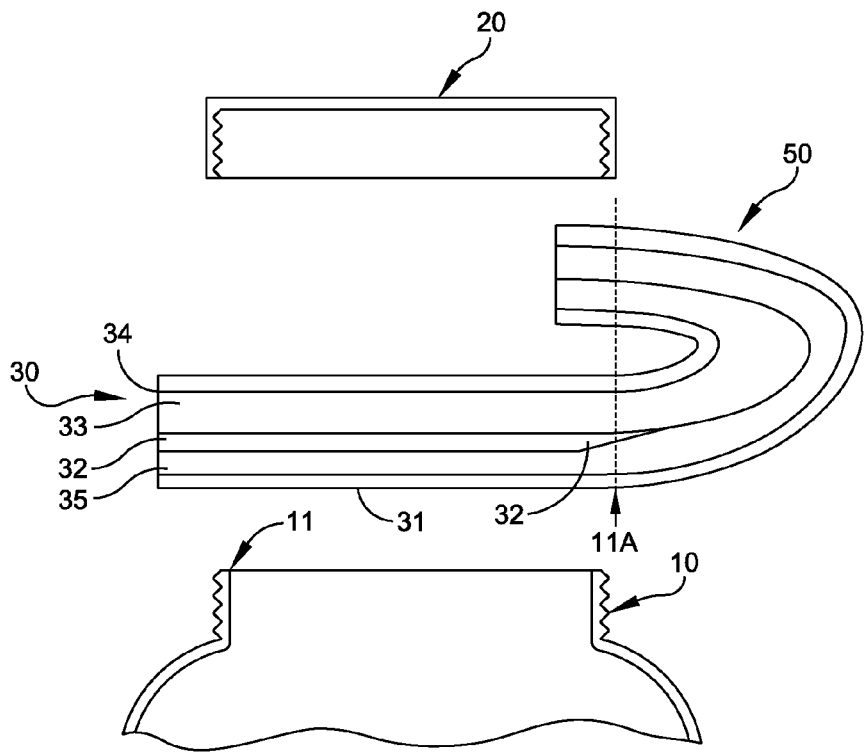
FIG. 2 a schematic cross section through this embodiment of the invention after doubling over of a tab.

Special attention is placed in this case on the layer 32. The metallic or induction layer 32, in contrast to all of the other layers, ends in the illustrated embodiment around the edge of the mouth 11. This can be seen in FIG. 1 by the absence of the layer 32 in the area to the right of the edge of the mouth 11; indicated purely schematically in FIG. 2 is also an end of the layer 32 in this area. Because the layers are all very thin in relation to their surface dimensions, the gradations that can be seen in FIG. 2 are insignificant in practice. This gradation is filled in, for example, by the sealing layer 31 or also by the foam layer 33 without any problem.

The omission of the metallic layer 32 in the area of the grip tab 50 leads to an appreciable advantage. During the induction sealing process of the sealing disc with the sealing layer 31 on the edge of the mouth 11 of the container 10, a difficulty is conventionally encountered, namely, due to the fact that a double metallic layer is present exactly in the surface area of the grip tab 50 owing to the doubling over of the grip tab. As a result of this, the induction does not proceed cleanly, because current is induced in two metallic surface sections, one lying on top of the other, and hence screening effects arise in the lower area. As a result of this, particularly in the area of the grip tab 50, the corresponding section of the edge of the mouth 11 of the container 10 is not properly sealed by the sealing layer 31, because it does not fuse in the same temperature range as do the other circumferential areas of the edge of the mouth 11.

Nor is this compensated for in the conventional sealing discs, but rather is only further complicated by the fact that, instead, especially in the area of the grip tab, two surface sections of the metallic layer 32 are now impacted by the induction device. This further complicates the efforts, by means of clever technical tricks, for instance, to mask the first mentioned interference temporarily by, for instance, using an induction device placed in non-parallel position to the surface of the sealing disc.

In accordance with the invention, however, this double surface of the metallic layer 32 does not appear on the mouth area of the container 10. The metallic layer is provided in a defined manner only in a position on top of the mouth 11 of the container 10 and is not impaired or influenced by any bending or other actions of the grip tab 50.

A manufacture of such a sealing disc having a grip tab, which does not contain all layers, can be undertaken such as is carried out in DE 10 2007 014 084 B3, for instance, with, of course, a correspondingly altered choice of the respective layer groups to be treated.

As can be seen in FIG. 2, in particular, a section of the sealing layer 31 is now situated below in a place where it is also required for sealing so as to close the container opening. On account of the doubled-over grip tab 50, however, another section of the sealing layer 31 is now also situated just on the surface of this grip tap 50 and points upward. In the case of conventional sealing discs, this leads to problems, because, in an induction sealing process, this sealing layer 31 now not only manifests its adhesive action below on the container mouth, as desired, but also above in the area of the grip tab, where it seals to the above-lying areas in an unwanted and undesirable manner, that is, to the bottom side of the screw cap 20.

As can also be seen in FIG. 2 in cross section, however, the metallic layer 32 lies practically directly on the sealing layer 31 in the area of the container mouth. Any heat induced in the metallic layer 32 will therefore be carried by thermal conduction nearly undiminished into the sealing layer 31 and can therefore increase its temperature such that the intended adhesive action ensues on the edge of the container mouth 11.

By contrast, an appreciably larger spacing now exists between the metallic layer 32 and the section of the sealing layer 31 on the grip tab 50. In particular, exactly two sublayers of the foam layer 33 lie here between the metallic layer 32 and the sealing layer 31 on top of the grip tab 50. Added to this is possibly also a sublayer of the layer 35.

This means that the heat conduction during the process of induction sealing is drastically reduced. The two sublayers of the foam layer 33 act, so to speak, as thermal insulation and ensure that the induced heat enters this area of the sealing layer 31 on top of the grip tab 50 only to an appreciably lesser extent.

As a result of this drastic reduction, the temperature increase in this section of the sealing layer 31 turns out to be so small that the adhesive action of the sealing layer 31 is not manifested and hence no adhesive attachment of the grip tab 50 to the bottom side of the lid 20 occurs.

Nothing changes for the user owing to the special design of the grip tab 50.

It is particularly preferred when the user can especially easily recognize the grip tab 50 against the background of the uppermost layer 34 of the sealing disc, that is, when the grip tab has a different color than the uppermost layer 34 on the side facing the viewer.

In this case, it should be noted that the top side of the grip tab 50 facing the user is the sealing layer 31 or the underlying foam layer 33, if the sealing layer is transparent.

It is especially preferred, moreover, that only after doubling over the grip tab 50, the side of the grip tab formed on top and the uppermost layer 34 can offer a unique visual appearance to the user and viewer.

As a result, the user can recognize especially easily the purpose for which the grip tab is now to be used and can see the purpose of it for gripping when the sealing disc is subsequently pulled off, for instance.

Thus, it has been found to be suitable, for instance, to image a tomato with stem on the upper side of the uppermost layer 34 of the sealing disc, with the stem being imaged in the area of the grip tab 50. This depiction would be suitable for a container holding tomato ketchup as filling material, for instance.

Not illustrated in FIGS. 1 and 2 is another embodiment. Thus, it is basically possible also to provide, in addition, a so-called reseal part. This is constituted by further layers, which then form the sealing layer above the group 30 and also above the doubled-over grip tab 50. This so-called reseal part remains in the lid 20, when it is lifted off, and improves the sealing, when the lid is put back in place after the group 30 of layers is pulled off, by resting on the edge of the mouth 11 of the container 10.

However, such reseal parts are not desirable or required for all filling materials, but can be correspondingly provided for the invention as well.

LIST OF REFERENCE NUMBERS

10 container
11 mouth of the container 10
20 lid of the container 10
30 group of layers
31 sealing layer
32 metallic layer that can be heated by induction
33 layer made of thermally insulating material, in particular plastic foam, referred to also as foam layer for brevity
34 uppermost layer of the group 30
35 layer made of polyester material

What is claimed is:

1. A sealing disc for a container closure used for a container having a mouth delimited by a circumferential edge,
    in which the sealing disc is composed of a plurality of layers with an edge, of which, before the container is opened for the first time, at least one group of layers tightly closes the mouth of said container,
    in which one of the layers of the group is a metallic layer that can be heated by induction,
    in which the other layers of the group are non-metallic and are unable to be directly heated by induction,
    in which the group of layers includes a sealing layer that is sealed on the circumferential edge of the mouth of said container,
    and a grip tab that projects beyond a circumferential edge of the metallic layer of the group for a length of a surface of the grip tab,
    in that at least one of the non-metallic layers is made of a thermally insulating material,
    in that the metallic layer terminates at the circumferential edge thereof so that the grip tab is formed only by the layer made of a thermally insulating material or by said layer of a thermally insulating material and one or more of non-metallic layers all unable to be directly heated by induction, and
    in that the grip tab that extends beyond the circumferential edge of the mouth of the container is folded and doubled over onto an uppermost layer of the group of layers so that all of the grip tab is disposed, once folded over, within the circumferential edge of the mouth of the container.

2. The sealing disc according to claim 1,
    further characterized
    in that the layer made of a thermally insulating material is a layer made of foamed plastic, and there is an absence of the metallic layer within the grip tab.

3. The sealing disc according to claim 2,
    further characterized
    in that the layer made of foamed plastic is formed from a foam made of expanded polyethylene (EPE foam).

4. The sealing disc according to claim 1,
    further characterized
    in that the layer made of thermally insulating material is arranged on the metallic layer that can be heated by induction on the side facing away from the sealing layer.

5. The sealing disc according to claim 1,
    further characterized
    in that the thickness of the layer made of thermally insulating material lies in one of the following ranges of between 50 mm and 300 mm, between 90 mm and 200 mm, and between 110 mm and 130 mm.

6. The sealing disc according to claim 1,
    further characterized
    in that the sealing layer extends over the surface of the grip tab, and the metallic layer is disposed over the sealing layer only within the circumferential edge of the mouth of the container.

7. The sealing disc according to claim 1,
    further characterized
    in that a layer made of a polyester material is arranged between the sealing layer and the metallic layer that can be heated by induction.

8. The sealing disc according to claim 7,
    further characterized
    in that the layer made of polyester material has a thickness of between 12 mm and 36 mm.

9. The sealing disc according to claim 1,
    further characterized
    in that the uppermost layer of the group of the layers is composed of polyethylene terephthalate (PET).

10. The sealing disc according to claim 1,
    further characterized
    in that the uppermost layer of the group of layers is provided with an image.

11. The sealing disc according to claim 10,
    further characterized
    in that the image is a depiction indicative of the contents of the container.

12. The sealing disc according to claim 10,
    further characterized
    in that the image also occupies the top side of the grip tab visible after having been doubled over.

13. The sealing disc according to claim 10,
    further characterized
    in that the image highlights the special significance of the grip tab by portraying a tomato with a stem on the grip tab.

14. The sealing disc according to claim 1,
    further characterized
    in that the group of layers is joined detachably to another group of upper layers of the sealing disc,
    in that the mouth of the container can once again temporarily be closed with the additional group of upper layers, and
    in that the grip tab, which is doubled over on the layer, is covered by the group of upper layers, so that the grip tab can be gripped for the initial opening of the container after detachment of the group of upper layers.

15. A sealing disc for a container having a mouth delimited by a circumferential edge, said sealing disc comprising:
- a sealing layer with an edge, of which, before the container is opened for the first time, the sealing layer closes the mouth of said container;
- a metallic layer that is disposed over the sealing layer and that is heated by induction so as to tightly seal the sealing layer with the circumferential edge of the mouth of the container;
- at least one non-metallic layer that is unable to be directly heated by induction;
- wherein the sealing disc has at least one grip tab that is formed from at least the non-metallic layer;
- wherein said grip tab is constructed and arranged to project beyond a circumferential edge of the metallic layer for an extended length of the grip tab;
- wherein the non-metallic layer is made of a thermally insulating material;
- wherein the metallic layer terminates at the circumferential edge thereof so that the grip tab is formed only of the thermally insulating material unable to be directly heated by induction, and
- wherein the grip tab that extends beyond the circumferential edge of the mouth of the container is folded and doubled over on an uppermost layer of the sealing disc so that all of the grip tab is disposed, once folded over, within the circumferential edge of the mouth of the container.

16. The sealing disc according to claim 15, wherein the layer made of a thermally insulating material is a layer made of foamed plastic, and there is an absence of the metallic layer within the grip tab.

17. The sealing disc according to claim 15, wherein the layer made of thermally insulating material is arranged on the metallic layer that can be heated by induction on the side facing away from the sealing layer, and the metallic layer is disposed over the sealing layer only within the circumferential edge of the mouth of the container.

18. The sealing disc according to claim 15, wherein the metallic layer is disposed over the sealing layer only within the circumferential edge of the mouth of the container.

19. The sealing disc according to claim 15, wherein a layer made of a polyester material is arranged between the sealing layer and the metallic layer that can be heated by induction.

20. The sealing disc according to claim 15,
- including another group of upper layers of the sealing disc,
- wherein the mouth of the container is once again temporarily closed with the another group of upper layers, and
- wherein the grip tab, which is doubled over on the layer, is covered by the group of upper layers, so that the grip tab is gripped for the initial opening of the container after detachment of the group of upper layers.

21. A method of forming a sealing disc for a container having a mouth delimited by a circumferential edge, said method comprising:
- providing a group of layers to form the sealing disc including a sealing layer with an edge for sealing with and closing the mouth of said container;
- disposing a metallic layer over the sealing layer and that is heated by induction so as to tightly seal the sealing layer with the circumferential edge of the mouth of the container;
- providing at least one non-metallic layer of a thermally insulating material and that is unable to be directly heated by induction;
- providing a grip tab that is formed from at least the non-metallic layer;
- projecting said grip tab, in a first position thereof, beyond the circumferential edge of the mouth of the container;
- terminating the metallic layer at a circumferential edge thereof and so that the grip tab is formed of only the thermally insulating material which is unable to be directly heated by induction, and
- in a second position thereof, folding and doubling over the grip tab that extends beyond the circumferential edge of the mouth of the container onto an uppermost layer of the group of layers so that all of the grip tab is disposed, once folded over, within the circumferential edge of the mouth of the container.

22. A sealing disc for a container having a mouth delimited by a circumferential edge, said sealing disc comprising:
- a sealing layer with an edge meant for sealing with and closing the mouth of the container;
- a metallic layer that is disposed over the sealing layer and that is heated by induction so as to tightly seal the sealing layer with the circumferential edge of the mouth of the container;
- at least one non-metallic layer of a thermally insulating material disposed over the metallic layer and that is unable to be directly heated by induction;
- at least one grip tab that is formed from at least the non-metallic layer;
- wherein said grip tab is constructed and arranged to have an initial position in which the grip tab projects beyond the circumferential edge of the mouth of the container;
- wherein said grip tab also has a folded over position in which the grip tab is folded and doubled over so as to be disposed entirely within the circumferential edge of the mouth of the container; and
- wherein the metallic layer terminates at a circumferential edge thereof that is coextensive with the circumferential edge of the mouth of the container so that the grip tab is formed only of the thermally insulating material unable to be directly heated by induction.

23. The sealing disc according to claim 22 wherein the metallic layer is disposed over the sealing layer only within the circumferential edge of the mouth of the container.

24. The sealing disc according to claim 22, wherein there is an absence of the metallic layer within the grip tab.

25. The sealing disc according to claim 22, wherein the metallic layer is omitted in the area of the grip tab.

* * * * *